May 5, 1964  F. O. SEGER  3,131,648
PRESSURE CUSHION DUNNAGE APPARATUS

Filed Dec. 20, 1960  2 Sheets-Sheet 1

INVENTOR.
FRITZ O. SEGER
BY Fred P. Kostka

ATTORNEY

May 5, 1964  F. O. SEGER  3,131,648
PRESSURE CUSHION DUNNAGE APPARATUS
Filed Dec. 20, 1960  2 Sheets-Sheet 2

INVENTOR.
FRITZ O. SEGER
BY Fred P. Kotka
ATTORNEY

United States Patent Office 3,131,648
Patented May 5, 1964

3,131,648
PRESSURE CUSHION DUNNAGE APPARATUS
Fritz O. Seger, Erie, Pa., assignor to Westinghouse Air Brake Company, Wilmerding, Pa., a corporation of Pennsylvania
Filed Dec. 20, 1960, Ser. No. 77,223
4 Claims. (Cl. 105—369)

This invention relates to freight dunnage methods and systems for freight carrying vehicles employing dunnage members in the form of mattresses and adapted to be interposed between cargo units in a collapsed condition during loading of the cargo units and expanded after loading so as to conform to the shape of and provide a shoring force to the cargo units between which the dunnage bags are interposed thereby to hold and cushion the units against shifting and shock in the event of jolting during transit.

It has heretofore been proposed to provide a dunnage system with dunnage members in the form of air mattresses that are chargeable with fluid under pressure from a common control pipe and are interposed between the cargo units in a freight carrying conveyance in a deflated condition during loading of the cargo and inflated at pressures above the ambient pressures after loading of the cargo units. The inflation of the dunnage members or mattresses in excess of ambient pressure causes an expansion of the latter so as to fill the voids between the cargo units and thus prevent shifting of, and damage to, the cargo units in the event of shock impacts to the conveyance during transit.

These prior air mattress type dunnage members are constructed to provide a cargo contacting surface area of approximately 9,200 square inches and are inflated when the cargo is loaded in the conveyance to a preselected pressure of between about one-half p.s.i.g. and three p.s.i.g. selected according to the nature of the cargo. For example, the lower range of pressure is employed for more fragile cargo units susceptible to crushing and the larger range of pressures is employed with more rigid units. The preselected gage pressure for inflating the mattresses is introduced at the point of loading. However, during transit to the point of destination, the barometric pressure or temperature within the car may vary thereby to cause a corresponding variance in the shoring force exerted by the inflated dunnage air mattresses. For example, the shoring force exerted by inflated dunnage members of the above-specified surface dimensions varies 575 lbs. for every ounce per square inch change in gage pressure in the dunnage member and varies 4,600 lbs. for every inch of mercury change in barometric pressure due to weather changes or changes in altitude, and varies about 1% for each six degrees Fahrenheit change in temperature. Thus, if the air pressure in the dunnage members increases even very slightly during transit from its point of origin to its point of destination, the cargo may be crushed, whereas if the gage pressure is reduced even slightly, the cargo may be inadequately shored and thus be able to shift and become damaged.

In the prior art devices it is proposed to provide a control for compensating for barometric and temperature changes so as to maintain the gage pressure substantially constant during transit. This is accomplished by a complex mechanical and pneumatically operated valve control device associated with the source of pressure mounted on the car. While this method has proven to be satisfactory, it has required a constant inspection and maintenance proving under some circumstances to be quite costly.

It is an object of the present invention to provide a dunnage system having dunnage bags in the form of mattresses provided with internal shoring force creating structure which is independent of ambient barometric and temperature conditions so that the shoring force remains substantially constant under the varying barometric and temperature conditions encountered during transit from the point of origin to the point of destination and which is compressible upon the creation of a vacuum within the bag to facilitate loading and unloading of the cargo from the vehicle.

In accordance with the present invention, this is accomplished generally by the provision of a plurality of dunnage bags communicable with an evacuating piping system. Each of the dunnage bags comprises an outer casing in the form of an air-tight envelope encasing a resilient, air pervious, filler means having a predetermined compression load and which is compressible and contractible upon the application of a vacuum within the casing and when disposed between adjacent rows of stacked cargo positioned in abutting relationship on the opposite faces of the bag is expandable to exert a shoring force upon the equalization of the pressure in said casing with the ambient pressure conditions within the cargo vehicle.

Other objects and advantages will become apparent from the following more detailed description of the invention and from the accompanying drawings, wherein.

Figure 1:
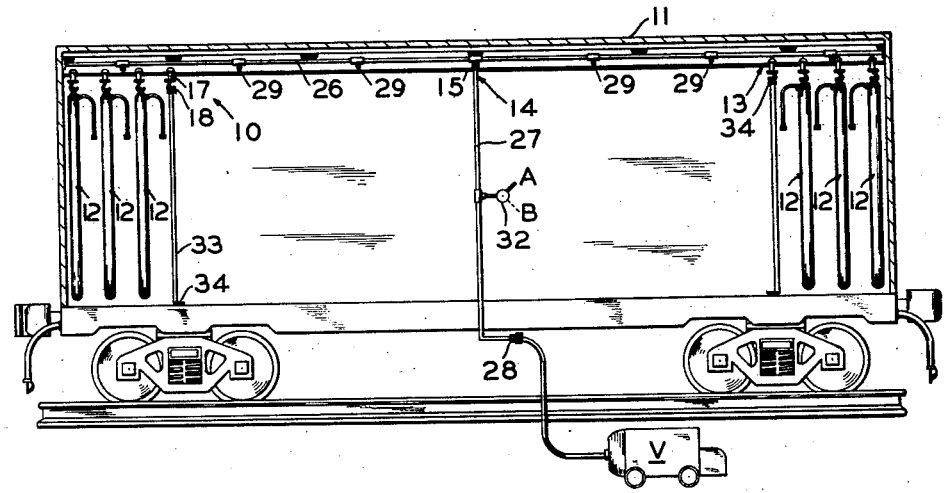
FIG. 1 is a longitudinal cross-sectional view in elevation of an empty freight car equipped with the dunnage system embodying the principles of the present invention.

Referring now to the figures, the dunnage system 10 of the present invention is shown embodied in a railroad freight car 11. It is to be understood, of course, that the dunnage system disclosed herein is also capable of being used with trailer trucks or other freight hauling vehicles.

The dunnage system 10 comprises generally a plurality of dunnage bags 12, a dunnage bag conveyance system 13 for selectively moving the bags 12 within the car and an evacuating system 14.

The dunnage bag conveying system 13 includes a pair of rails 15 and 16 suitably mounted on the inner surface of the top of the freight car 11. Supported for rolling movement on the rails 15 and 16 are hangers or carriages 17 having suspended therefrom hooks 18. The hooks 18 receive eyes 19 which are rigidly fastened to a bar 20 fixedly adhered to the top of a dunnage bag 12.

Each of the dunnage bags 12 is in the nature of a mattress and comprises an outer casing 21 formed from sheet material suitably hermetically sealed along its edges so as to form an air-tight envelope. The sheet material is a flexible and air impervious material, such as, neoprene rubber, butyl, or the like. The casing 21 is filled with a resilient filler 22 capable under normal ambient conditions of providing a force resisting compression ranging between about one-half to three p.s.i. This force or compression loading of the resilient filler is employed to exert the required shoring force on the sides of the bag, as more fully to be explained hereinafter.

In accordance with the present invention, the filler comprises an air pervious structure preferably having an open cell structure, so that upon evacuation of air from the bag, the ambient atmospheric pressure on the exterior of the casing 21 is effective to compress the filler structure and thereby to collapse or contract the bag 12. The filler structure is preferably lightweight and readily bendable so as to facilitate the handling of the bag 12 during loading and unloading of the cargo from the railroad car 11.

Figure 3:
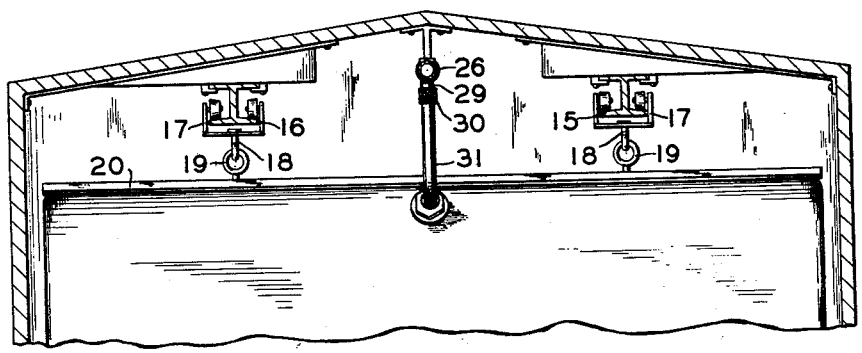
FIG. 3 is a fragmentary end view of the car taken along the lines 3—3 of FIG. 1.
Figure 4:
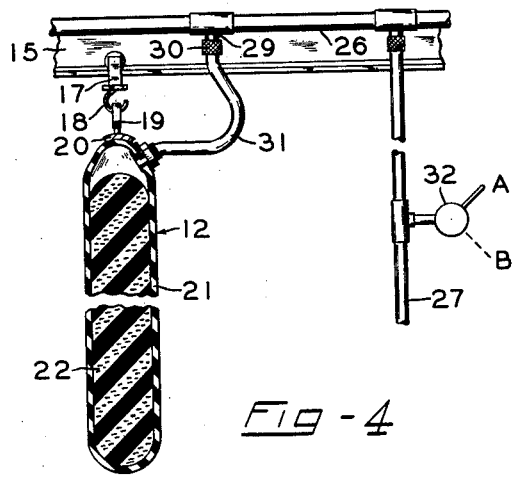
FIG. 4 is a fragmentary view of the dunnage system showing in cross section one embodiment of a dunnage bag made in accordance with the present invention and showing a fragmentary view of the evacuating piping system connected to an evacuator and its association with the dunnage bag.
Figure 5:
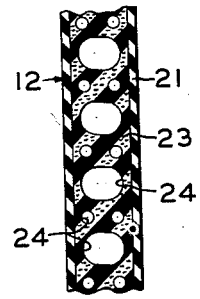
FIG. 5 is a fragmentary cross-sectional view of a dunnage bag showing a second embodiment of the internal filler structure which may be employed to create the desired shoring force.
Figure 6:
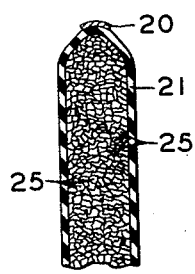
FIG. 6 is a fragmentary cross-sectional view of the dunnage bag showing a third embodiment of the internal filler structure which may be employed as the shoring force creating means.

As shown in FIGS. 3, 4 and 5, respectively, some of the filler structures found to be particularly suitable are a cellular sponge rubber block 22, a molded compressible foam plastic, block 23, such as, foamed polyurethane formed with internal cavities 24, or shredded pieces of sponge rubber 25. Each of the resilient filler materials 22, 23 or 25 is inserted in the bag 12 in its normal unloaded or expended condition so as to hold the sides or cargo-contacting faces of the casing 21 spaced from each other so that upon contraction of the bag 12, the compression loading of the filler exerts a force of between about one-half to three p.s.i. on the cargo-contacting sides of the bag 12.

The evacuating piping system 14 for contracting the bags 12 comprises a manifold 26 running lengthwise of the car 11 adjacent the top thereof and communicating with a feeder pipe 27 having one end 28 extending exteriorly of the car 11. The end 28 is adapted to be connected to an evacuator V which may be conveniently located at the site of loading or unloading of the car 11. It is, of course, to be understood that each of the cars of a freight train may be provided with evacuating units, but with the dunnage system of the present invention, this would probably not be economically feasible because one evacuator at the site of loading or unloading may be employed to evacuate the systems in each of the different cars of a freight train.

The manifold 26 is provided with a plurality of spaced quick-release disconnect coupling connections 29 for receiving complementary coupling connections 30 of a flexible hose 31 extending from the top of the bags 12, as shown. The disconnect coupling connections 29 are of the type which upon disconnection of the flexible hose coupling 30 therefrom is operative to close when a vacuum is applied in the manifold 26 by way of the evacuator V. The hose coupling 30 is of the type which when disconnected from the manifold coupling 29 is operative to admit freely into the bag 12 the ambient air in the car. The hoses 31 are of sufficient length to permit positioning of the bags between any one of the spaced quick disconnect coupling connections 29 and the end of the flexible hoses 31 extending into the bags 12 are hermetically sealed so as to prevent leakage therethrough. For venting the bags 12 to permit expansion of the filler structure 22, 23 or 25 and thereby the casing 21, there is connected in the feeder pipe 27 a valve 32 which in the position A is operative to vent the evacuating pipe system to atmosphere and in the position B to shut off communication with the atmosphere. It is to be noted that the feeder pipe 27 and the valve 32 are conveniently located inside the car adjacent the door of the car 11 to as to permit manipulation thereof without having to climb over the cargo.

Figure 2:
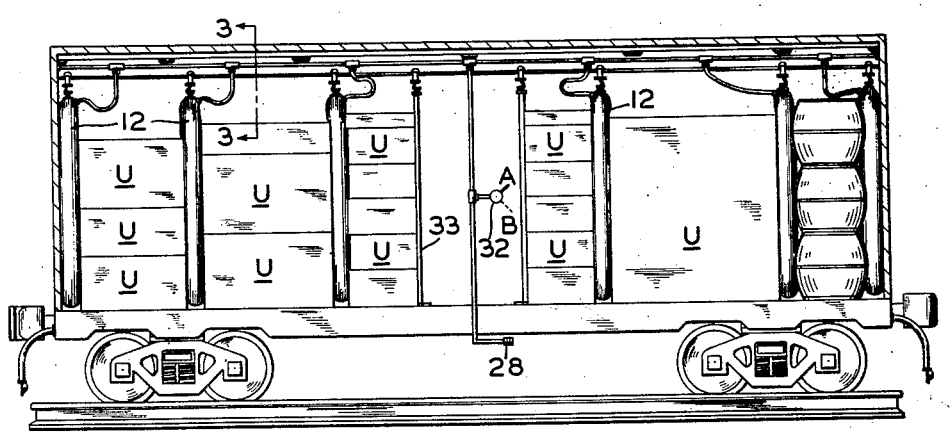
FIG. 2 is a view similar to FIG. 1 except that it shows the dunnage bags in their operative shoring position between the units of cargo for effectively cushioning the cargo against shock.

If it is desired to only partially fill the interior of the car 11 with cargo, the dunnage bag system may be provided, as shown in FIGS. 1 and 2, with barrier or plates 33. The bracing plate 33 is supported similarly to the dunnage bags 12 by hangers 17 and hooks 18 supported on the rails 12 and 14 of which the hooks 18 are adapted to receive eyes 34 carried on the top of the barrier plate 33. The bottom of the plate 33 is provided with a pair of feet 34 which are adapted to be rigidly fastened to the floor of the car 11.

*Operation*

In operation, the bags 12 are all moved to one side of the empty car 11 with the flexible hoses 31 disconnected from the manifold 26. The pipe end 28 is connected to an evacuator V, which is preferably of the portable type so that it can be moved from one car to the other without moving the entire train during loading or unloading of the cargo, and the valve 32 is positioned at B for applying a vacuum to the bags 12 through the evacuating piping system via line 27 and manifold 26.

One of the bags 12 is then moved on the conveying system 13 to a position adjacent the end wall of the freight car and its flexible hose 31 connected to the closest manifold disconnect coupling connections 29 so as to apply a vacuum in the bag 12. In this manner, the bag 12 is collapsed and the air pervious filler material therein is compressed by force of the ambient atmosphere on the exterior of the casing 21. The cargo units U are then stacked in close abutting relationship against the exposed face of the bag 12. Thereafter another bag 12 is positioned on the opposite side of the stacked cargo and its hose 31 is connected to another of the quick disconnect couplings whereupon the bag 12 is also collapsed and further cargo units U are then positioned and stacked in close abutting relationship against the other face thereof. This process is continued until the car 11 is filled the desired amount. The cargo is thus positioned in close proximity to each other with the collapsed dunnage bags 12 firmly held therebetween. After the cargo has been suitably braced so that it is ready for transit, the valve 32 is positioned at A and is opened to atmosphere and the evacuator is disconnected from the pipe 27. While the disconnection of the evacuator V from the pipe 12 without opening of the valve 32 is effective to vent the bags 12 to atmosphere, during transit, the ambient atmospheric conditions exterior of the sealed car may be different from the conditions existing in the interior thereof so that a pressure differential exists between the interior and exterior of the bags 12. Such a pressure differential may cause a relative contraction or expansion of the bags 12 so as to create a variable shoring force tending to crush or to permit shifting of the cargo. However, with the provision of the valve 32 within the car 11, and opened to the conditions therein, there is assurance that the pressure conditions in the interior and on the exterior of the bags 12 are always equal. In this manner, the shoring force provided by the bags is maintained constant during transit.

Upon equalization of the pressure within the bag 12 and the surrounding atmospheric pressure within the car 11, the resilient material firmly held between the adjacent rows of the cargo tends to expand to return to its normal shape under the influence of its compression loading exerted by the filler material 22, 23 or 24. This expansion of the bags 12 is operative to fill the voids between the adjacent sides of the cargo units and provide a shoring force equal to that being exerted by the resilient filler material between the cargo units thereby to cushion and inhibit movement of the cargo units relatively to each other during transit.

If desired, the dunnage bags 12 may also be positioned longitudinally of the freight car 11 by merely detaching one of the eyes 19 carried by a hook 18 on one of the rails and positioning it on a hook 18 on the same rail. Further, the bags 12 need not extend the height of the car but may be made of any desired length depending upon the cargo to be carried.

Having now described the invention, what I claim as new and desire to secure by Letters Patent, is:

1. A dunnage bag system, comprising, in combination with a carrying conveyance, a plurality of dunnage bags disposed in said conveyance for cushioning cargo units and providing a shoring force, each of said dunnage bags comprising an air impervious casing, a compressible, resilient and air pervious material filler means having a predetermined compression loading disposed in said casing in unloaded and expanded condition, an air conduit system in said conveyance and connected to said bags, an evacuator releasably connected to said air conduit system for evacuating air from said bags to effect collapse of said bags prior to loading of cargo in said conveyance, and valve means for connecting said conduit system to atmosphere for effecting expansion of said bags to cushion said cargo after said cargo is loaded in said conveyance.

2. The method of controlling expansion and contraction of dunnage means for shoring cargo in a freight conveyance, which comprises, evacuating the air from within air pervious resilient dunnage material while preventing air from entering said material to effect compression of said material by ambient air pressure, disposing said material in the compressed state in juxtaposition with cargo within the conveyance to substantially fill the unfilled cargo space in the conveyance in at least a direction of expected acceleration of the conveyance, and, pervading the material with air at ambient pressure to permit inherent expansive force exerted by the material to provide shoring force on the cargo with respect to the confines of the cargo-carrying space in said direction.

3. The method of controlling the expansion and contraction of dunnage bags for shoring cargo units into a freight carrying conveyance with a plurality of bags comprising an airtight flexible casing and an air pervious resilient filler material having a predetermined compression loading which comprises the steps of evacuating air from said bags so as to compress said filler material and thereby contracting said bags, positioning said contracted bags so that each of said bags is firmly held on opposite sides thereof between a wall of said conveyance and a row of cargo units and between adjacent rows of cargo units, and venting each of said contracted bags to the atmosphere in said conveyance to equalize the pressure in the interior of said bags with the atmospheric pressure within said conveyance so that each of said bags and said filler material therein expands to conform to the respective contour of the surfaces between which said bags are held and exerts a shoring force equal to said compression loading of said filler material on said cargo units.

4. The method of controlling the expansion and contraction of dunnage bags for shoring cargo units in a freight carrying conveyance with a plurality of bags comprising an air impervious flexible casing and an air pervious compressible resilient filler material having a predetermined compression loading, which comprises the steps of evacuating air from at least one of said bags so as to compress said resilient material and thereby contract said bag, positioning one of the surfaces of said contracted bag against one of the walls of said conveyance and stacking cargo units in abutting relationship against the opposite surface of said bag, positioning one face of another air-evacuated and contracted bag over the exposed sides of said previously stacked cargo units, stacking further cargo units against the opposite face of said bag, bracing said cargo against movement in said car and thereafter venting each of said positioned bags to atmosphere to equalize the pressure in the interior of said bags with said atmospheric pressure within the said conveyance so that said bag and said compressible material expand to conform to the sides which said bag abuts and to exert a shoring force on said cargo units equal to said compression loading of said filler material.

References Cited in the file of this patent

UNITED STATES PATENTS

| | | |
|---|---|---|
| 2,232,646 | Stone et al. | Feb. 18, 1941 |
| 2,703,232 | Ross | Mar. 1, 1955 |
| 2,856,867 | Dasey | Oct. 21, 1958 |
| 2,859,959 | Hardigg | Nov. 11, 1958 |
| 2,860,768 | Smithers | Nov. 18, 1958 |